United States Patent
Böhm et al.

(10) Patent No.: US 6,318,819 B1
(45) Date of Patent: Nov. 20, 2001

(54) METHOD FOR HANDLING ERRORS IN AN ELECTRONIC BRAKE SYSTEM AND CORRESPONDING DEVICE

(75) Inventors: Jürgen Böhm, Oberneisen; Stefan Stölzl, Weinheim; Peter Willimowski, Bruchköbel; Oliver Hoffmann, Frankfurt am Main; Joachim Nell, Hanau; Rainer Oehler, Darmstadt, all of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/601,778
(22) PCT Filed: Feb. 3, 1999
(86) PCT No.: PCT/EP99/00687
§ 371 Date: Oct. 25, 2000
§ 102(e) Date: Oct. 25, 2000
(87) PCT Pub. No.: WO99/39955
PCT Pub. Date: Aug. 12, 1999

(30) Foreign Application Priority Data

Feb. 7, 1998 (DE) .............................. 198 04 933
Jul. 22, 1998 (DE) .............................. 198 32 950

(51) Int. Cl.$^7$ ........................................ B60T 8/88
(52) U.S. Cl. ................................. 303/122; 303/20
(58) Field of Search .................. 303/122, 20, 3, 303/122.02, 155, 122.01, 122.07–122.15; 701/35, 70, 71, 76, 97; 73/117.3; 709/222; 188/1.11

(56) References Cited

U.S. PATENT DOCUMENTS

| | | | |
|---|---|---|---|
| 4,287,505 | * | 9/1981 | Ohmori et al. . |
| 5,458,404 | * | 10/1995 | Fennel et al. ......................... 303/122 |
| 5,594,646 | | 1/1997 | Itoh et al. . |
| 5,707,117 | | 1/1998 | Hu et al. . |
| 5,713,643 | * | 2/1998 | Esselbrügger et al. ......... 303/122.08 |

FOREIGN PATENT DOCUMENTS

| | | |
|---|---|---|
| 39 27 562 | 2/1991 | (DE) . |
| 43 02 925 | 8/1994 | (DE) . |
| 44 00 203 | 9/1995 | (DE) . |
| 195 10 525 | 9/1996 | (DE) . |
| 195 26 250 | 1/1997 | (DE) . |
| 195 48 560 | 6/1997 | (DE) . |
| 196 34 567 | 3/1998 | (DE) . |

OTHER PUBLICATIONS

Search Report of the German Patent Office for Application No. 198 32 950.4.

* cited by examiner

Primary Examiner—Douglas C. Butler
(74) Attorney, Agent, or Firm—Rader, Fishman & Grauer PLLC

(57) ABSTRACT

Electronic brake systems are functionally split-up safety-critical real-time systems which are subject to high standards with regard to error detection and error handling. This invention describes a method and corresponding device for error handling in such systems which permits only a few defined system conditions, inclusive of a pre-check, with the transition from one system condition to the next condition only being possible if certain defined events take place.

15 Claims, 3 Drawing Sheets

METHOD FOR HANDLING ERRORS IN AN ELECTRONIC BRAKE SYSTEM AND CORRESPONDING DEVICE

TECHNICAL FIELD

This invention generally relates to error handling methodology and more particularly relates to a method of handling errors in an electronic brake system of vehicles.

BACKGROUND OF THE INVENTION

Brake systems of automotive vehicles are becoming increasingly complex. Systems such as anti-lock control systems (ABS), traction control and vehicle stabilizing systems require individual brake management for individual wheels. These systems, when activated, often cause feedback pulsations through the brake pedal. These pulsations are highly annoying to the driver.

A remedy is provided by a mechanical decoupling of wheel brake actuation and brake pedal. The latter now only serves to detect the driver's intention to brake by means of suitable sensors. This intention is electrically transmitted to the brakes. Systems provided with such a decoupling have come to be known as "brake-by-wire systems". They have been described, e.g., in DE-Z "ATZ Automobiltechnische Zeitschrift 98 (1996) 6, pages 328–333 (translated as: GJAT German Journal of Automobile Technology), in U.S. Pat. No. 5,230,549, and in EP 0 467 112 B1. The lowest level of such a system of, typically, modular design is formed by four intelligent wheel brake modules. They perform wheel-individual adjustment of a required wheel brake torque. For the overall system, they are, in a manner of speaking, universal intelligent actuators. They consist of a microcontroller (slave) for control, a power booster and of the actual electromechanical wheel brake. This lowest level forms the wheel brake management.

The medium level is responsible for the brake management of the entire car, e.g., for a situation-specific distribution of the braking forces to the individual wheel brakes. The hardware of this medium level of the vehicle brake management consists of a central computing unit (master) which typically, for reasons of failure safety, is supervised by an additional system-supervising computing unit.

The top level of such a brake-by-wire system represents the interface with the driver. Typically, it consists of a conventional brake pedal reproduction with redundant sensor systems for detecting the driver's intention to brake and with additional elements of supervision which can indicate various error conditions of this so-called pedal module. This pedal module also takes care of pre-processing the sensor signals. This pedal module, also, may include a microcontroller of its own.

The individual levels are connected with each other in terms of data by means of defined logical interfaces and, typically, via a bus system adapted for real-time-based operation and preferably provided redundantly. Thus, these levels guarantee an optimum modularity of the system.

It is possible to substitute for the two bus systems (or rather for even just one bus system, only, if such is the case) by normal analog lines.

Power management or rather energy supply is a further central component of a modular-design brake system.

The brake-by-wire system is a functionally split-up safety-critical real-time system which must fulfill very high standards in terms of error detection and error handling.

The driver having no direct access to the brake, the brake system is required to maintain one emergency function in case of trouble. This is ensured by failure-active, functional redundancy in the known manner. Further, the systems are to include a high-performance online diagnosis in the known manner which, by all means, detects any errors cropping up so that an appropriate emergency function can be activated and the driver can be alerted.

These requirements have decisive effects on designing the energy supply, central brake control, and even the warning strategy of the electronic brake system.

Failure safety of the energy supply is ensured in the known manner (cf. the above-mentioned German journal) by introducing a tandem onboard network. If one partial system fails, there will be maintained a certain operability of the components supplied in the failed circuit.

It is necessary both to register any error appearing and to detect its source to ensure a safe operation of the vehicle brake management (regulatory and controlling functions). A known strategy is therefore the requirement of providing a supervisory device on this level by all means. The use of plausibility criteria and suitable, continuously performed check routines within the software are measures by means of which error conditions are localized and appropriate emergency functions are activated.

Thus, it is known from the quoted German journal to check the computing units (master and slaves) of the system by means of a supervisory computing unit. In doing so, all computing units are provided with the essential data (driver's intention to brake, vehicle speed, brake torques etc.), and by means of plausibility considerations it is possible to check the computations of the other computing units.

If there is a malfunction of the master or of the supervisory computing unit, the slaves are able to diagnosticate this and to switch over to an emergency function of the brake system without participation of the master.

Any malfunctions of a slave can be detected by the master and the supervisory computing unit. Then, the slave may be shut down, the emergency function of the remaining wheel brakes not being impaired.

Further, from DE 195 10 525 A1, measures have become known which improve the aforementioned electronic brake systems in view of any error conditions in the field of detecting the braking intention. There, error signals are reported to the wheel brake management via the vehicle brake management. Then, the wheel brake management initiates wheel-individual measures.

The aforementioned known measures, however, do not yet guarantee any comprehensive optimized safety concept.

Regarding a comprehensive safety concept in the corresponding error handling system, what is needed is to detect all errors of the electronic brake system and to consider their effects on the respective driving situations. Using the known concepts, this would imply to have to include a multitude of different conditions of the brake system in the safety considerations which would render the system very complex. However, the more complex the structure of a system is, the more prone it becomes to troubles or errors which then may lead to failures of components of the electronic brake system. Additionally, it will be difficult to perform a reconfiguration of the brake system after an error or trouble condition has developed.

Further, the known case does not feature a systematic strategy for handling conditions when there are multiple faults.

It is an object of this invention to implement the method referred to at the beginning or rather to expand the device so as to enable the number of the various conditions of the electronic brake system, the system finds itself in when error detection and handling take place, to be kept as small as possible and to have clearly defined conditions.

According to this invention, this task is solved by the steps of

- determining and defining a small number of unambiguous technological operating conditions of the brake system with predefinition of certain, defined technological events which alone effect a transition from one operating condition to the next condition;
- of combining the technological operating conditions with condition-specific control/regulatory measures as well as with measures of warning to the driver of the vehicle; and of
- detecting errors in the brake system at the start of the vehicle by means of a pre-drive check and, on-line, during the operation of the vehicle; and of implementing error-condition-responsive error handling in accordance with the operating conditions.

Regarding the apparatus of the present invention, this task is solved by the following

- a small number of unambiguous technological operating conditions of the brake system is determined and defined with predefinition of defined technological events which alone effect a transition from one operating condition to the next condition;
- in that the computing unit combines the technological operating conditions condition-specifically with respectively control/regulatory and warning devices for the driver; and in that
- the error handling code includes a pre-drive check routine for detecting any errors in the brake system at the start of the vehicle and, on-line, during the operation of the vehicle, which implements error-condition-responsive error handling in accordance with the operating conditions.

The electronic modular-design brake system always is in an exactly defined condition when there appears any error or a plurality thereof, with the number of the various conditions being very small. Thus the system advantageously does not become too complex and therefore decisively less prone to errors or troubles which might lead to failures of system components. The factors which defined condition the system are fully known at all times. It is therefore easily possible to implement any reconfiguration of the brake system after an error appeared.

Preferably, even unused memory spaces of the computing units, RAMs, ROMs, etc. are set to a defined value in order to enable the operator to know even in this respect at any time which condition the system and its memory area, also, are in.

This invention further has the transition from one defined condition to the next defined condition take place only due to the occurrence of very certain defined events which likewise has a decisive effect on the failure safety of the system.

The inventive method with the defined conditions of the system and the defined transitions is usable for (preferably) electromechanical brake systems, yet just as well for electronically assisted brake systems in general.

Thus, this invention ensures error-condition-responsive error handling in a brake-by-wire system.

According to a further development of this invention, this method for error handling in an electronic modular-design brake system is implemented by the following steps:

- determining and defining a small number of unambiguous technological operating conditions of the respective module with predefinition of certain, defined technological events which alone effect a transition from one operating condition of the module to the next condition;
- combining the technological operating conditions of the module with condition-specific control/regulatory/reporting and warning measures, respectively; and
- detecting errors in the respective module at the start of the vehicle by means of a pre-drive check and, on-line, during the operation of the vehicle; and implementing error-condition-responsive error handling in accordance with the operating conditions of the module.

Besides the central computing unit, the corresponding device includes modules in the form of autonomous subcomputing units with error handling codes. These autonomous subcomputing units are organized so that

- a small number of unambiguous technological operating conditions of the respective module is determined and defined with predefinition of certain, defined technological events which alone effect a transition from one operating condition to the next condition;
- they combine the technological operating conditions condition-specifically with respectively control/regulatory and warning devices for the driver; and
- the error handling code includes a pre-drive check routine for detecting errors in the brake system at the start of the vehicle and, on-line, during the operation of the vehicle and implements error-condition-responsive error handling in accordance with the operating conditions.

Due to this further development of the invention, a self-diagnosis is carried out on the respective modules, (i.e., in a way, an error diagnosis within the modules themselves, which considerably relieves the central computing unit of the brake system).

DETAILED DESCRIPTION OF THE PREFERRED EMBODIMENTS

Figure 1:
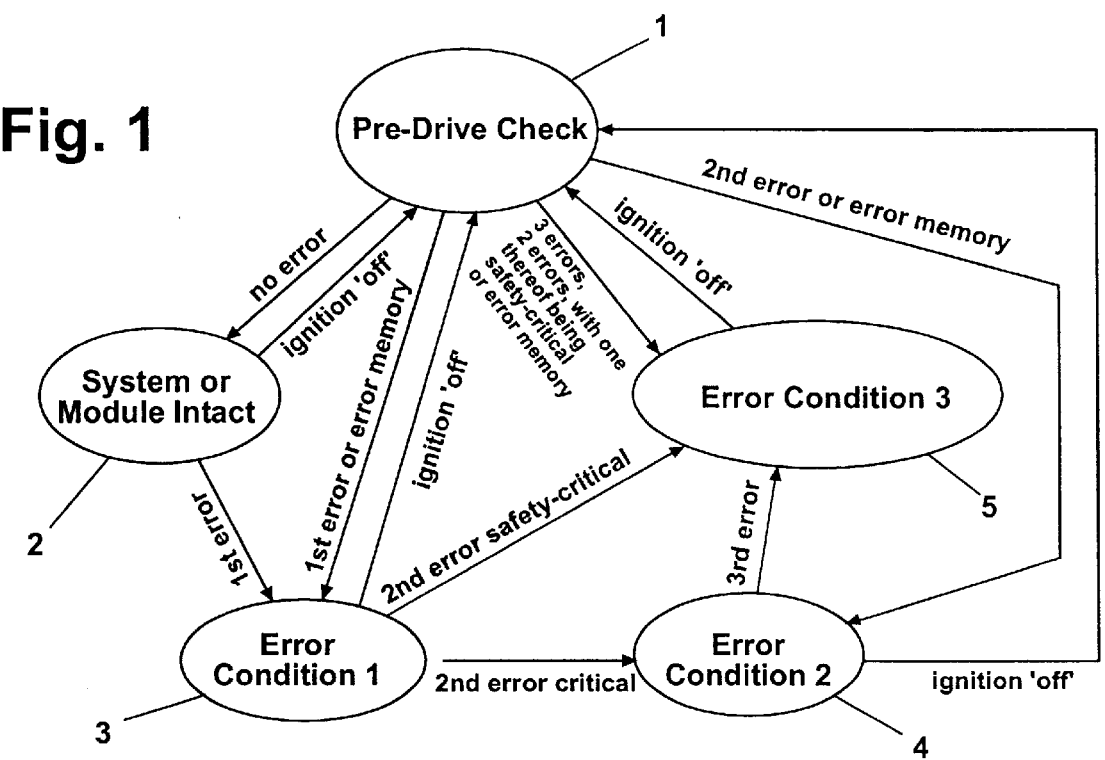
FIG. 1 is a fundamental condition diagram of a brake-by-wire system with defined transitions.

FIG. 1 shows the inventive condition diagram for a brake-by-wire system with a small number of very defined technological conditions of the system and with defined technological transitions between the individual conditions of the system.

The condition diagram as per FIG. 1 both applies to the overall system and to corresponding subsystems of the individual modules of the brake-by-wire system if the same, in accordance with a preferred embodiment, is designed so that every module is equipped with a subsystem of its own, provided with an intelligence, in order to autonomously detect even the errors in the corresponding module and to depict them. This relieves the central error handling system which, in a way, has not "to follow up" the individual errors in the modules. It rather receives complete status reports on the error condition of the respective module from the autonomous subsystem. Error detection in the individual modules takes place by means of methods known.

This invention preferably provides the following five conditions at the maximum for the overall system under review as well as for the subsystems making up this overall system. In FIG. 1, corresponding reference numerals have been assigned to these conditions:

1) pre-drive system check (PSC) or rather pre-drive module check (PMC),
2) brake system intact,
3) error condition 1,
4) error condition 2, and
5) error condition 3.

The transitions between conditions 1 through 5 are characterized by arrows. The occurrence of any transition takes place only if there occur the events at the transitions as described along the arrows of FIG. 1.

The pre-drive system check or rather the pre-drive module checks according to condition 1 include test routines by means of an error handling code in the respective system computing units which take place at the start of the vehicle (ignition 'on') or upon applying the brake pedal (brake light switch). After a diagnosis, this check decides whether the brake system and the individual modules are intact or whether there is a certain error condition. In accordance with this diagnosis, the modules or rather the overall brake system at once pass over into the corresponding condition 2 or 3, 4, 5. This pre-drive check is particularly expedient for a brake-by-wire-type brake system as this is an auxiliary energy brake system without any mechanical level to fall back on. As regards pure hydraulic brake systems it is not easily possible to perform an active supervision and diagnosis.

When performing this pre-drive system check, it is e.g. possible to shortly actuate all the brakes by means of an error handling code in the central computing unit and check whether all the sensor signals and corresponding status reports are available. As an alternative, the modules of the brake system above all and, possibly, the energy supply system, are tested, meaning that the results of the individual pre-drive module checks are read out. This functionality is preferably implementable in the central computing unit. Depending on the condition of the overall brake system, the central computing unit at once has to take the feasible measures corresponding to the situation. In case of failure of a wheel module it is, e.g., possible to redistribute the braking force to the still intact modules. Altogether, it is possible to configurate the functionality of the brake system in accordance with its actual condition.

As in the preferred example the remaining modules likewise include one computing unit, at the minimum, a separate error handling code is run on each of these modules. The overall coordination of these various error handling codes preferably takes place via the central computing unit or rather in the module wherein the error handling code is run as per FIG. 1. As a preferred embodiment, each module has a pre-drive module check of its own. The operability and the condition of the module are checked by means of this, each time, separate module test routine when the vehicle is started (ignition 'on') or when the brake pedal is applied (brake light switch).

If a module does not have a computing unit or electronics of its own, able to carry out the pre-drive module check, this test routine can be taken over by another module.

If the brake system is in an error condition this condition is stored in an error memory so that, during the next pre-brake check, the system at once resumes this condition unless there has appeared a new error which will then have the brake system pass over into another error condition. Thus, after the occurrence of an error, the "brake system intact" condition is not resumed before, e.g., the brake system has been repaired.

As an option, it is possible to add an error memory reset function to the pre-drive system check or pre-drive module check, respectively. An error having cropped up during the operation of the brake system, this is at first stored in the error memory which can be realized either centrally or, likewise, modularly within the individual modules. Upon the following start of the vehicle (ignition 'on') the error memory or memories is/are read out. If an error memory contains error condition 2 or error condition 3 (system condition 4 or 5), this stored error condition will be resumed for the time being after the checks. With error condition 2 having been stored in the error memory and another error being added during the pre-drive checks, error condition 3 is adopted. However, with error condition 1 (system condition 3) having been stored, it is possible to introduce the reset function. This means that it is possible to delete error condition 1 in the error memory if there did not appear any error during the pre-drive checks. If error condition 1 includes actuating a corresponding warning lamp this means that in this case it is possible to not actuate the warning lamp for an unduly long time.

Expanding the error memory, it is possible to include the number of the $1^{st}$ error, to appear, in the counting. If there is a certain, previously defined minimum number of these occurrences ($1^{st}$ error during operation and reset when performing the pre-drive checks) the corresponding warning lamp can stay actuated.

The error conditions of FIG. 1 are preferably combined with a determined warning-stage strategy, i.e., with warning stages which should prevail when various errors are detected in the electronic brake system, i.e., which are linked to a certain actuation. There may crop up errors of varying criticality in such an electronic brake system. For instance, in case of an imminent total failure, it is necessary "to force" the driver to get the vehicle at a slow speed of, e.g., 30 kph out of the endangered area and to safely park it by means of the parking brake.

Error condition 1 (system condition 3) characterizes the appearance of an error not critical as it does not influence the basic driving behavior considerably and ensures the full basic function of the brake system. Failure of the ABS system is an example thereof.

A specific signal for the driver such as a yellow warning lamp can be assigned to this error condition 1.

Error condition 2 (system condition 4) characterizes the appearance of a critical error having some, if yet controllable, influence on the driving dynamics. An example: failure of a circuit (battery) or of one brake, respectively. A specific signal such as a red warning lamp is likewise assigned to this error condition.

Error condition 3 (system condition 5) characterizes the appearance of an overcritical error influencing the basic braking function, e.g., a reduced performance of the wheel brake because of a small clamping force level or an extremely critical error pointing to an imminent total failure of the brake system. An example: failure of both batteries.

To this error condition, there is likewise assigned a specific signal such as the red warning lamp in accordance with error condition 2 in conjunction with the generation of an acoustic warning signal and/or reduction of the maximum vehicle speed to a predetermined fixed value such as 50 kph. This speed limitation can be brought about via actuating the e-gas (or rather via an intervention in the engine management). It is further conceivable to include time measurement therein. The longer the system awaits repair, the more the maximum speed is reduced. In the simplest case it is possible to equate error condition 2 with error condition 3 and, e.g., to only actuate the red warning lamp which, however, would correspond to the warning-lamp strategy of the art of today.

It has already been stated that it is expedient for each module to have a computing system of its own, with an assigned error routine each being implemented therein. The condition diagrams of the individual modules are represented in FIGS. 2 through 6 in the same way as in that of the system as per FIG. 1. FIGS. 2 through 6 illustrate the individual conditions and corresponding transitions.

Figure 2:
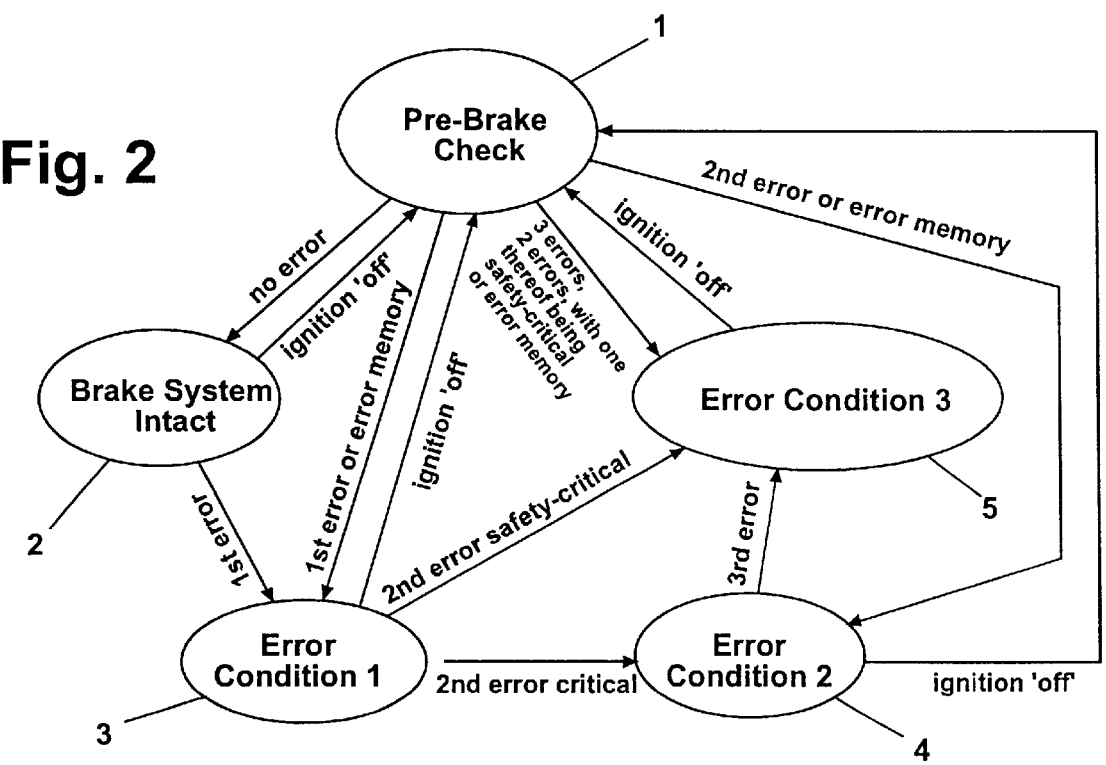
FIG. 2 is the condition diagram of the brake-by-wire system with defined transitions for the overall brake system.

FIG. 2 is the condition diagram for the overall brake system. The pre-braking check of the condition can be compared to the pre-system check of condition 1 in FIG. 1. The various conditions and transitions of FIG. 2 which correspond to those of FIG. 1 are preferably implemented in the central computing unit of the electronic brake system. This functionality is referred to by the term of "error handling code of the central computing unit".

Figure 3:
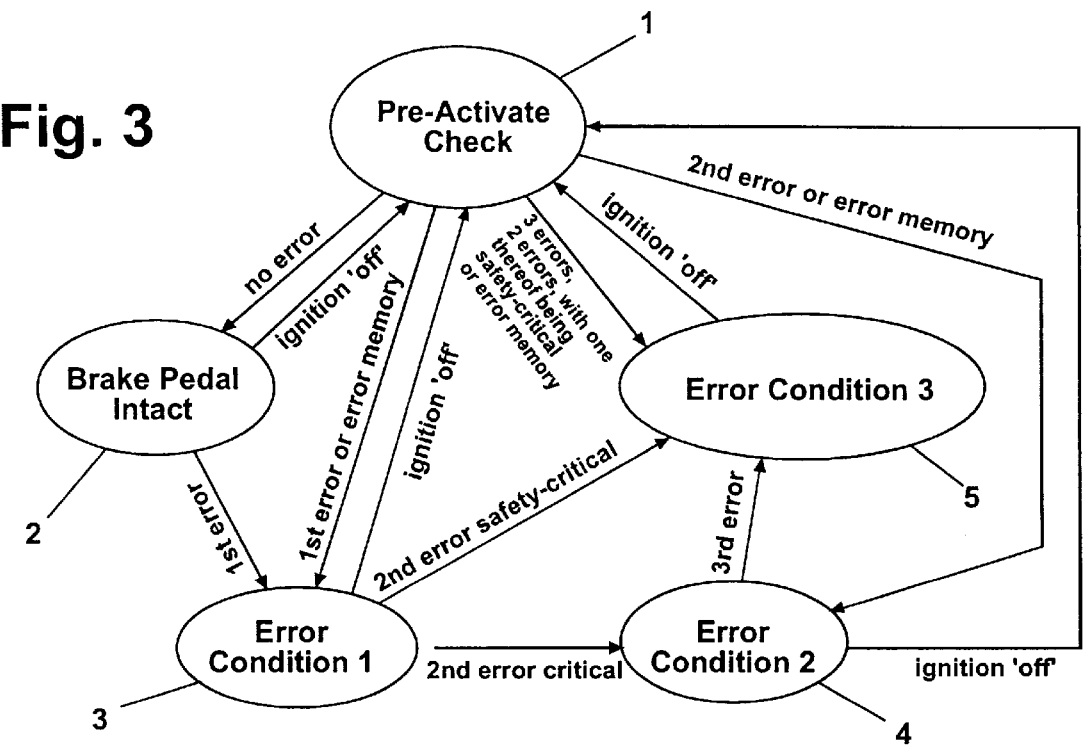
FIG. 3 is the condition diagram of the brake pedal module with defined transitions.

The condition diagram of the brake module is represented in FIG. 3.

With regard to the brake pedal module, the pre-pedal check of condition 1 at least includes a check of the sensor system of the pedal and, as far as possible, a function test of the evaluation electronics for the pedal-electronics generation of the driver's intention and of the bus connections.

For the rest, the condition diagram corresponds to that of FIG. 1.

Figure 4:
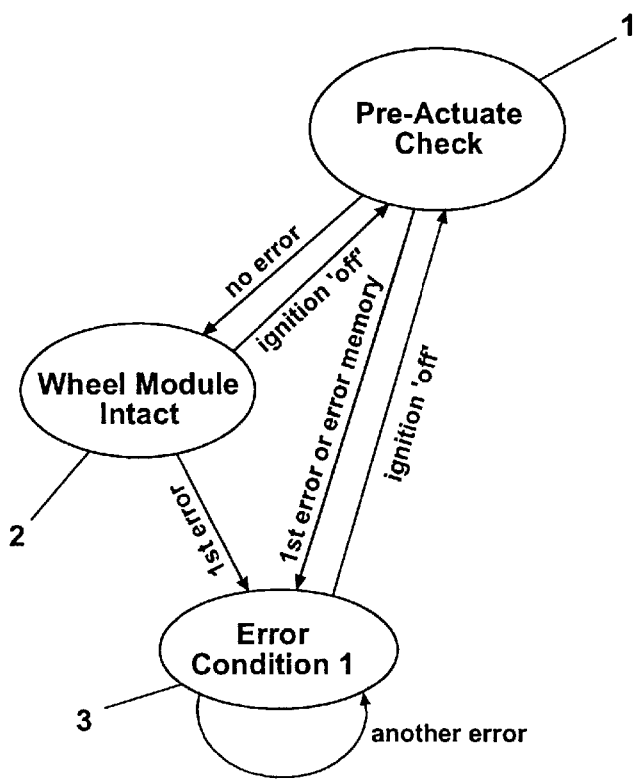
FIG. 4 is the condition diagram of one wheel module each with defined transitions.

FIG. 4 represents the condition diagram for each of the wheel modules. Performing its own pre-wheel-module check (condition 1), each wheel module checks whether, for instance in case of an electronic brake system, the electric motor can be actuated, the brake linings can be moved and the sensor system of the wheel module gives a plausible reaction to the recommendations of the pre-module check. In principle, the electronics and mechanics and the sensor system of the wheel module are submitted to an operability check as comprehensive as possible. As can be seen in FIG. 4, the condition diagram of the wheel module does not include error conditions 2 and 3. This is due to the fact that, even when at least two errors appear within one wheel module, the yellow warning lamp is actuated, only, if there does not appear any further error within the overall system.

Figure 5:
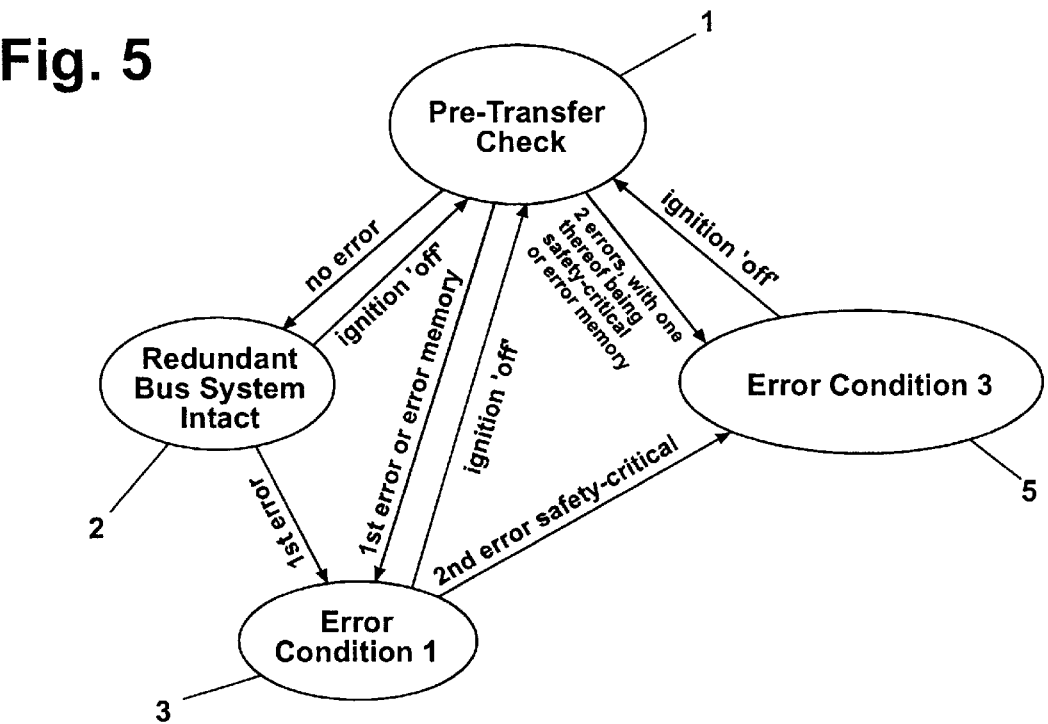
FIG. 5 is the condition diagram of the energy supply with defined transitions.

FIG. 5 represents the condition diagram of the bus system.

As regards the bus system, a preferred embodiment is based on the assumption that the bus system features a redundant design and includes two bus systems. In case of failure of one bus system, the failure of the second bus system would imply a total failure of the entire brake system. It is therefore necessary to immediately pass over to error condition 1 (condition 3).

Therefore, there is no condition 4 in the error strategy of the bus system.

The pre-bus check (condition 1) fundamentally includes checking whether it is possible to reach all participants via the redundant bus system and whether they give a "sign of being alive" in the form of a response message.

This pre-bus check can also be performed by another module, i.e., there is no need for the bus system to have a microcontroller of its own.

Figure 6:
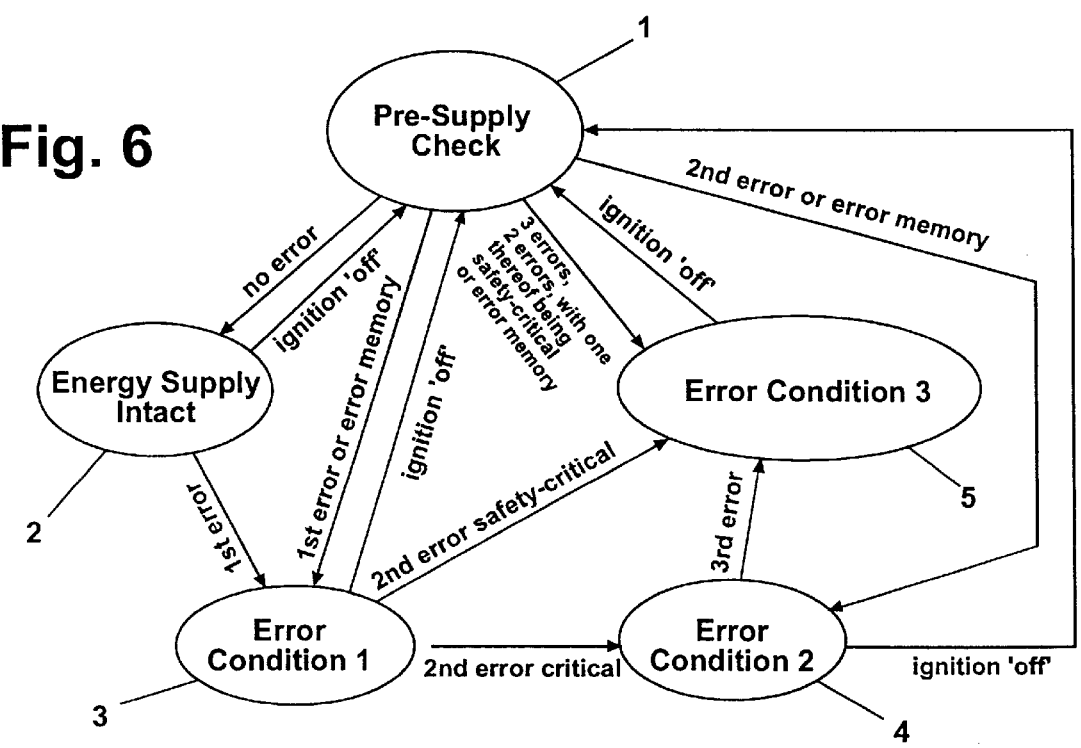
FIG. 6 is the condition diagram of the energy supply of the brake system in a special position.

The condition diagram of the energy supply of the brake system as per FIG. 6 is in a special position. This is due to the fact that the energy supply is a component of the brake system. A redundant-design energy supply in a vehicle may, e.g., be available for the electric units of the vehicle in general and thus for the brake system, also. This means that the interface between the energy supply and brake system, for instance, may be realized by two separate power lines. Then, e.g., the pre-power check (condition 1 of FIG. 6) could be limited to a check performed on the battery voltage supply required for the brake system. In an expanded check, the charges of the batteries are tested in addition and it is checked whether the same are still sufficient for the brake system.

A preferred embodiment of the energy supply results in the transition to error condition 1 (condition 3) and in actuating the yellow warning lamp after a first error has appeared (e.g., failure of the generator). Permanent supervision of the charges of both batteries is necessary in this condition. There must be a transition to error condition 3 if there is a drop below a certain minimum level of the charge in one of the batteries.

The condition diagrams represented in FIGS. 2 through 6 are preferred examples of embodiments.

In principle, one sole module is able to take over the functionality and coordination of all modules. In such a case, the design of this module is preferably error-tolerant so as to permit a majority decision in case of an error. Thus, a simplified embodiment allows all pre-module checks and the pre-system check to be performed in one sole module, e.g., in the module of the central computing unit. Error-tolerant means that, if there appears a single error, in a redundant system, the defective branch is detected by a majority-decision logic so that the branch which continues to be operable keeps up the operability of the system, thereby it being possible to "tolerate" the detected single error.

With regard to the coordination of the transitions between the individual conditions, there is the following preferred embodiment:

Each module performs its own coordination. At least one module performs the coordination for the entire system.

The warning devices may be actuated in the following ways:

1) One error-tolerant module takes care of this task. This means that, even if there crops up an error within the error-tolerant module, the module itself goes on to be able to actuate the warning lamps and, if provided, likewise the acoustic warning device and the speed limitation.
2) At least two modules actuate the warning devices. There is no need for these two modules to feature an error-tolerant design. In case of failure of one of these modules, the other module can take over the task of actuating the warning devices.
3) The warning devices have a device of their own, e.g., in the form of electronic evaluation electronics able to determine which modules of the system have failed. Thereby, self-actuation of the warning devices is possible.
4) The functionality of all modules is such as to actuate the warning lamps, all modules knowing the condition of the warning devices and of the other modules. This means that all modules know the condition of the brake system. The warning devices are actuated via an OR operation. This means, e.g., that, after the yellow warning lamp has been actuated, any other module of the brake system can actuate the red warning lamp if there is a further (module) failure.

Any possible inconsistency with regard to the gravity of the failure and, consequently, with regard to actuating the warning lamps is deliberately put up with. For instance, two wheel module failures cause the red warning lamp to be actuated. However, if there is a failure of one energy supply system (one failure) there may ensue a failure of one circuit (two wheel modules) as a matter of consequence. This will in principle be rated a yellow warning lamp. In this case, a second, independently appearing, error should by all means be rated higher than a single error even if this leads to a higher functional degradation in order to have the system not become unduly complex and thus, possibly, more prone to errors on the whole.

What is claimed is:

1. A method for handling errors in a modular-design electronic brake system of vehicles comprised of a number of intelligent modules, comprising the steps of:

determining and defining a small number of unambiguous technological operating conditions of the brake system with predefined technological events which alone effect a transition from one operating condition to the next condition;

combining the technological operating conditions with condition-specific control measures as well as with measures warning the driver of the vehicle;

detecting errors in the brake system and implementing error-condition-responsive error handling in accordance with the operating conditions;

determining and defining a plurality of unambiguous technological operating conditions of the respective module with predefinition of certain, defined technological events which alone effect a transition from one operating condition of the module to the next condition;

combining the technological operating conditions of the module with at least one condition-specific control, regulatory, reporting, and warning measure; and detecting errors in the respective module and implementing error-condition-responsive error handling in accordance with the operating conditions of the module.

2. A method as claimed in claim 1, further including the step of determining five technological operating conditions of the system or of the module, including the conditions:

pre-check system or module intact error condition 1 error condition 2 error condition 3, with the number of error conditions being variable in dependence on the module.

3. A method as claimed in claim 2, further including the step of:

assigning with correspondingly specific control/regulatory/warning measures, an uncritical error to error condition 1, a critical error to error condition 2, and a safety-critical error to error condition 3.

4. A method as claimed in claim 2, wherein a brake pedal module is connected to a central computing unit of the system by way of a bus system, wherein the pre-check of the pedal module includes steps of checking the pedal sensor system, the electronics, the power supply and the bus and signal connections, respectively.

5. A method as claimed in claim 1, further including the step of storing a detected error after the vehicle has been parked and in that error handling after the following pre-check is made dependent on the result of said following pre-check.

6. A method as claimed in claim 1, further including the step of implementing the operating-condition-specific control/regulatory/reporting as well as warning measures in dependence on the number of appearances of a certain error.

7. A method as claimed in claim 1, wherein the control measure includes reducing vehicle speed.

8. A method as claimed in claim 7, wherein the speed reduction takes place in a timed manner.

9. A method as claimed in claim 1, wherein with regard to at least one module, error handling is co-performed by another module.

10. A device for handling errors in a modular-design electronic brake system of vehicles including a number of intelligent modules which at least includes one central computing unit for actuating wheel brakes in dependence on the driver's intention to brake and on an operating condition of the brake system, comprising:

means for determining a plurality of unambiguous technological operating conditions of the brake system which alone effect a transition from one operating condition to the next condition;

means for combining the technological operating conditions condition-specifically with respectively control/regulatory and warning devices for the driver; and means for conducting a pre-check routine for detecting any errors in the brake system and, means for implementing error-condition-responsive error handling in accordance with the operating conditions, central computing means for centrally executing error handling code for handling errors, wherein, within each module, there is provision of autonomous subcomputing units provided with error handling codes in addition to said central computing means, wherein each said module includes means for determining a plurality of unambiguous technological operating conditions which alone effect a transition from one operating condition to the next condition;

means for combining the technological operating conditions condition-specifically with respectively associated control, regulatory, and warning devices; and wherein the error handling code includes a pre-check routine for detecting any errors in the brake system at the start of the vehicle and during the operation of the vehicle and implementing error-condition-responsive error handling in accordance with the operating conditions.

11. A device as claimed in claim 10, wherein the computing unit is organized each time so that five technological operating conditions of the system or of the module are determined, including the conditions pre-check system or module intact error condition 1 error condition 2 error condition 3, with the number of error conditions being variable in dependence on the module.

12. A device as claimed in claim 10, further including warning devices that are adapted to the criticality of the error.

13. A device as claimed in claim 10, further including error memory.

14. A device as claimed in claim 10, further including error counter.

15. A device as claimed in claim 10, further including a subcomputing unit provided for a plurality of modules wherein, said subcomputing includes an error-tolerant design.

* * * * *